(12) United States Patent
Proper (10) Patent No.: US 6,918,595 B2
(45) Date of Patent: Jul. 19, 2005

(54) SEAL FOR HIGH-PRESSURE PUMPING SYSTEM

(75) Inventor: George N. Proper, Milpitas, CA (US)

(73) Assignee: Dionex Corporation, Sunnyvale, CA (US)

( * ) Notice: Subject to any disclaimer, the term of this patent is extended or adjusted under 35 U.S.C. 154(b) by 0 days.

(21) Appl. No.: 10/303,354

(22) Filed: Nov. 22, 2002

(65) Prior Publication Data

US 2004/0100038 A1 May 27, 2004

(51) Int. Cl.[7] .......................... B60T 11/236; F16J 15/32
(52) U.S. Cl. ........................ 277/436; 277/437; 277/553; 277/554
(58) Field of Search .................. 277/436–437, 277/549–558

(56) References Cited

U.S. PATENT DOCUMENTS

| | | | | |
|---|---|---|---|---|
| 2,816,784 | A | * 12/1957 | Stucke | 277/554 |
| 3,813,105 | A | * 5/1974 | McQueen | 277/554 |
| 3,981,620 | A | 9/1976 | Abrahams et al. | |
| 4,067,407 | A | 1/1978 | Berg | |
| 4,141,562 | A | * 2/1979 | Wu | 277/309 |
| 4,173,437 | A | 11/1979 | Leka et al. | |
| 4,193,606 | A | * 3/1980 | Iverson | 277/556 |
| 4,245,963 | A | 1/1981 | Hutchins et al. | |
| 4,260,342 | A | 4/1981 | Leka et al. | |
| 4,453,723 | A | * 6/1984 | Greenwald | 277/618 |
| 4,453,898 | A | 6/1984 | Leka et al. | |
| 4,768,933 | A | 9/1988 | Stachowiak | |
| 4,893,823 | A | 1/1990 | Strouse et al. | |
| 5,144,882 | A | 9/1992 | Weissgerber | |
| 5,265,890 | A | * 11/1993 | Balsells | 277/467 |
| 5,431,415 | A | 7/1995 | Millonig et al. | |
| 5,482,297 | A | 1/1996 | Burns et al. | |
| 5,524,905 | A | 6/1996 | Thoman et al. | |
| 5,542,682 | A | 8/1996 | Goldstein et al. | |
| 5,799,953 | A | 9/1998 | Henderson | |
| 5,979,904 | A | 11/1999 | Balsells | |
| 5,984,316 | A | 11/1999 | Balsells | |
| 5,992,856 | A | 11/1999 | Balsells et al. | |
| 6,007,070 | A | * 12/1999 | Heathcott et al. | 277/510 |
| 6,050,572 | A | 4/2000 | Balsells et al. | |
| 6,086,070 | A | 7/2000 | Tremoulet, Jr. et al. | |
| 6,145,845 | A | 11/2000 | Tremoulet, Jr. et al. | |
| 6,161,838 | A | 12/2000 | Balsells | |
| 6,264,205 | B1 | 7/2001 | Balsells | |

\* cited by examiner

Primary Examiner—Alison Pickard
Assistant Examiner—Vishal Patel
(74) Attorney, Agent, or Firm—Dorsey & Whitney LLP (57) ABSTRACT

A high-pressure pumping system including an energizing seal component having an aperture extending therethrough and a seal jacket component having a base and a toroidally-shaped flared membrane extending from the base. The body and the flared membrane are monolithically formed of an inert polymeric seal material. The flared membrane extends through the aperture and encircles the energizing seal component to isolate the energizing seal component from fluid of the pumping system. The flared membrane may extend axially from the body and encircle the energizing seal component. The flared membrane may encircle the energizing seal component and overlaps a portion of the base. The seal jacket component may be formed around the energizing seal component. The seal jacket component may include a flange extending radially outwardly from the base.

19 Claims, 6 Drawing Sheets

SEAL FOR HIGH-PRESSURE PUMPING SYSTEM

BACKGROUND OF THE INVENTION

1. Field of the Invention

The present invention relates to a new and improved flange seal. In particular, the present invention relates to flange seals suited for use with high-pressure devices such as a chromatography pump.

2. Description of Related Art

High-pressure liquid chromatography (HPLC) generally requires the components of a sample to be separated or analyzed be dissolved in a mobile phase liquid, termed an eluent, and conveyed by that liquid to a stationary phase, that is, a chromatography column. HPLC eluent delivery systems are used to supply the liquid and deliver the liquid, with dissolved sample, to the column. Selected pressures ranging from substantially atmospheric pressure to pressures on the order of thousands of pounds per square inch are common to force the liquid into the column. Specially designed HPLC pumps are used to withstand extreme pressures and to deliver the liquid at precisely controlled flow rates in a smooth and uniform manner.

Figure 2:
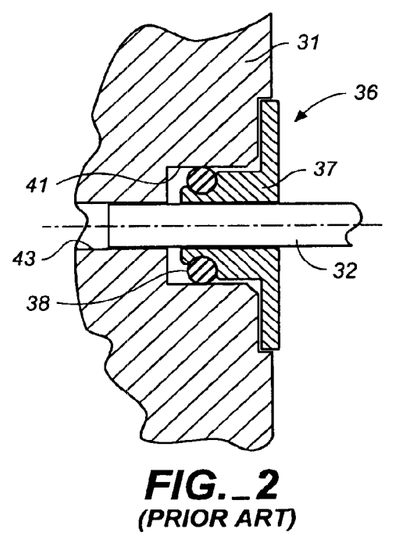
FIG. 2 is a cross-sectional side view of a prior art seal mounted in a pump head of a high-pressure pump.

HPLC pumps are generally piston pumps. The pump head of an HPLC pump often utilizes a special high-pressure seal through which a reciprocating piston extends. For example, as shown in FIG. 2, a pump includes a pump head 31 and a reciprocating piston 32 that extends through pump head 31. Piston 32 also extends and reciprocates in a direction along the center line of piston 32 through a conventional seal generally indicated by the numeral 36. Such conventional seals generally include a seal body 37 through which piston 32 extends. An O-ring 38 is provided to seal against an inner cavity wall 41 of pump head 31 as shown in FIG. 2.

Disadvantageously, the configuration of conventional seals can lead to abrasion and granulation of O-ring 38. In particular, as the HPLC operates, piston 32 reciprocates and causes the working fluid within the pump to pressurize and depressurize, which may cause O-ring 38 to move back-and-forth, or side-to-side as viewed in FIG. 2. Such movement of O-ring 38 causes the O-ring to chafe against inner cavity wall 41 thus causing abrasion, granulation and/or other wear of the O-ring, which in turn, may lead to contamination of the working fluid and/or the mobile phase flowing through the pump. In particular, O-ring 38 may be formed of a fluoropolymer material and the introduction of such particles into the flow stream through the pump can lead to fluorine contamination of the chromatography system utilizing such a conventional seal. In addition, the O-ring may contain ionic or organic contaminates that can leach out into the fluid stream.

Other conventional pump seals are constructed with an inert polymeric ring containing an energizing internal component that transfers compressive force to the pump head and the pump piston. Exemplars of such conventional pump seals are U.S. Pat. Nos. 4,453,898, 4,260,342 and 4,173,437 which show a dual-piston reciprocating pump assemblies.

A wide variety of materials have been used for both the polymeric ring and the energizing internal component but most commonly, the inert polymeric ring for HPLC applications utilize a fluoropolymer such as polytetrafluoroethylene (PTFE) or TEFLON® while the energizing internal component is typically either a stainless-steel spring or an elastomeric O-ring. Disadvantageously, pumped fluid may contact the energizing internal component either directly or indirectly under normal operating conditions.

Accordingly, the particular material of the energizing seal component must be chosen depending upon the pumped fluid flowing through the HPLC pump. For example, a stainless-steel energizing spring is suitable for use with nonpolar pumped fluids such as methylene chloride or hexane. Stainless-steel, however, is not suitable for use with acidic aqueous pumped fluids as such fluids may cause corrosion of the spring and contamination of downstream chromatographic components. Similarly, elastomeric materials, which may be chosen for corrosive aqueous pumped fluids, are largely incompatible with relatively nonpolar solvents such as methylene chloride, tetrahydrofuran (THF) or hexane. Such solvents extract impurities, which can result in a significant decrease in the performance of chromatographic device, which in turn, may lead to high background levels for isocratic conditions and spurious peaks under gradient conditions. The cleanest and least problematic O-ring materials are typically very expensive flow polymer based O-rings. Consequently, pumping systems require a variety of different pump seals which must be changed when switching from one solvent to another thus adding considerable complexity which may compromise pump maintenance and/or considerable added expense.

What is needed is an improved high-pressure seal that overcomes the above and other disadvantages of known seals.

BRIEF SUMMARY OF THE INVENTION

In summary, one aspect of the present invention is directed to a seal for a high-pressure pumping system including an energizing seal component having an aperture extending therethrough and a seal jacket component having a base and a flared membrane extending from the base. The flared membrane extends through the aperture and encircles the energizing seal component.

Preferably, the energizing seal component is toroidally shaped, and in one embodiment, is an O-ring. The energizing seal component may be formed of an elastomeric material. Alternatively, the energizing seal component may be a spring formed of stainless-steel and/or other suitable materials.

Preferably, the flared membrane extends axially from the body and encircles the energizing seal component. Preferably, the flared membrane encircles the energizing seal component and overlaps a portion of the base. In one embodiment, the seal jacket component is formed around the energizing seal component. The seal jacket component may include a flange extending radially outwardly from the base.

Preferably, the seal jacket component is formed of an inert polymeric seal material. The seal jacket component may be formed of a fluoropolymer. Preferably, the body and the flared membrane are monolithically formed. Preferably, the flared membrane is configured and dimensioned to isolate the energizing seal component from fluid of the pumping system.

Another aspect of the present invention is directed to a seal for a high-pressure pumping system including an energizing seal component formed of an elastomeric material and having an aperture extending therethrough and a seal jacket component having a base and a toroidally-shaped flared membrane extending from the base. The body and the flared membrane are monolithically formed of an inert polymeric seal material. The flared membrane extends through the aperture and encircles the energizing seal component to isolate the energizing seal component from fluid of the pumping system.

Preferably, the flared membrane extends axially from the body and encircles the energizing seal component. Preferably, the flared membrane encircles the energizing seal component and overlaps a portion of the base. In one embodiment, the seal jacket component is formed around the energizing seal component. In one embodiment, the seal jacket component includes a flange extending radially outwardly from the base.

An object of the present invention is to provide an improved seal for a high-pressure pumping system.

Another object of the present invention is to provide an improved seal designed and configured to reduce, minimize and/or prevent O-ring abrasion.

It is a further object of the present invention to provide an improved high-pressure seal for an HPLC pump that minimizes contamination of fluid passing through the pump.

The seal for a high-pressure pumping system of the present invention has other features and advantages which will be apparent from or are set forth in more detail in the accompanying drawings, which are incorporated in and form a part of this specification, and the following Detailed Description of the Invention, which together serve to explain the principles of the present invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Figure 3:
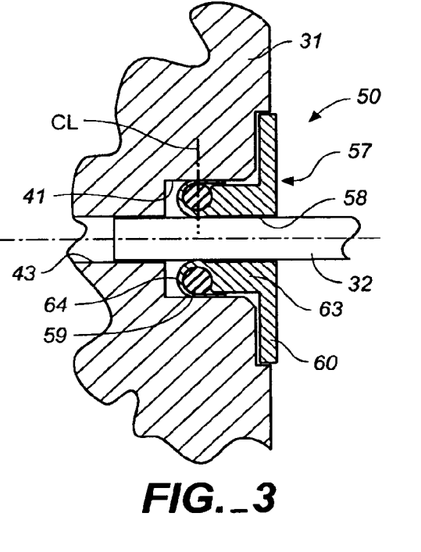
FIG. 3 is a cross-sectional side view of the a seal mounted in a pump head of a high-pressure pump in accordance with the present invention.
Figure 4:
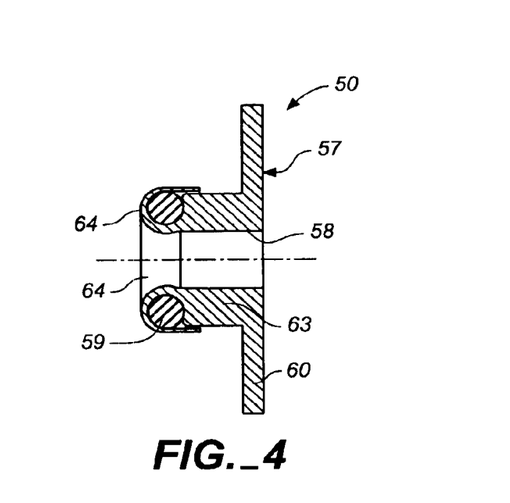
FIG. 4 is an enlarged cross-sectional side view of the flange seal of FIG. 3.

Turning now to the drawings, wherein like components are designated by like reference numerals throughout the various figures, attention is directed to FIG. 3 which illustrates an HPLC pump 30 with which a toroidally-formed wrap-around seal 50 can be used in accordance with the present invention. One should appreciate that seal 50 is suitable for use as a pump seal for all high-pressure pumping systems in accordance with the present invention.

Figure 1:
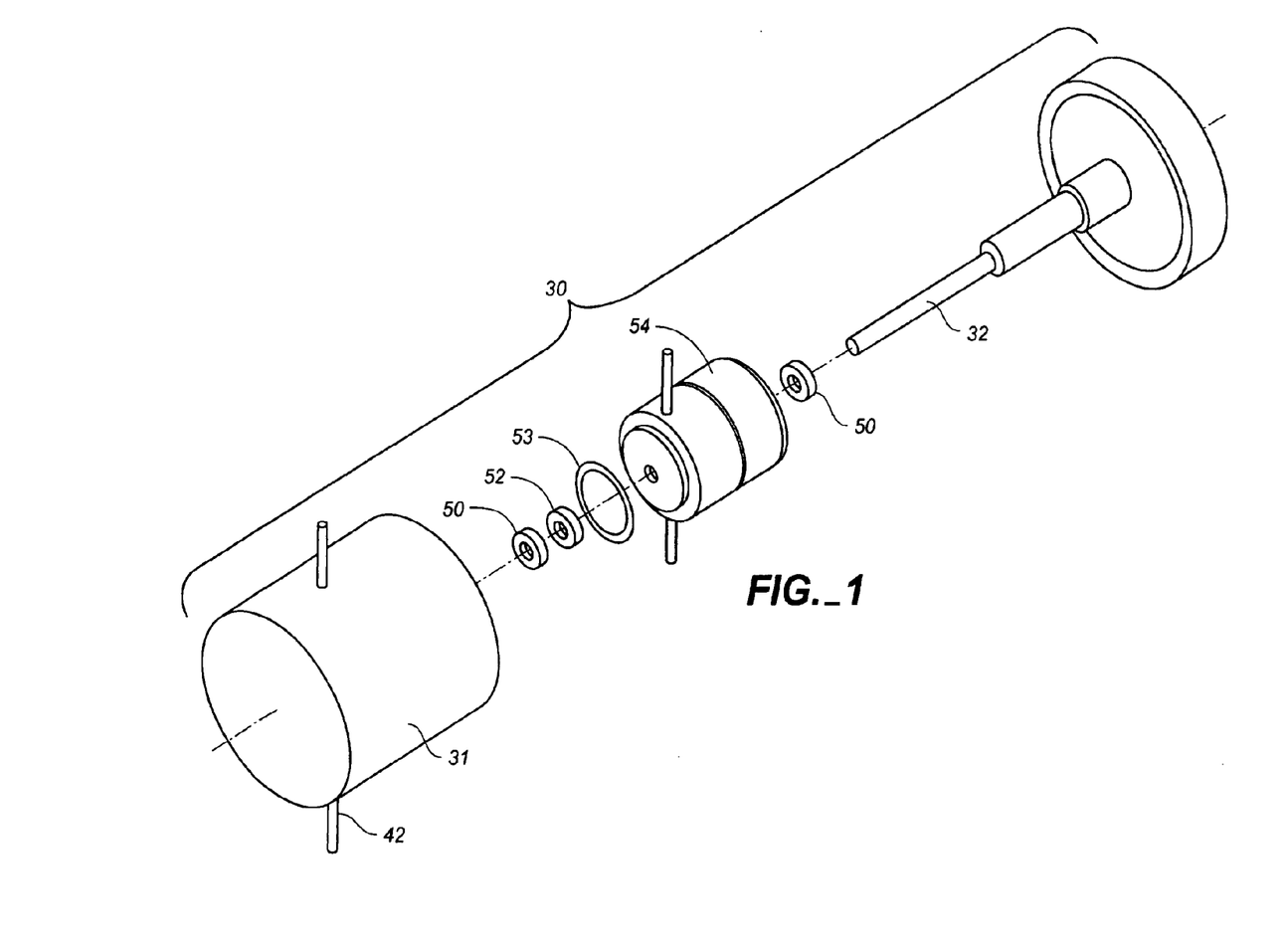
FIG. 1 is an exploded perspective view of an HPLC pump utilizing a seal for a high-pressure pumping system in accordance with the present invention.

With reference to FIG. 1, HPLC pump 30 is a piston pump that pumps chromatography eluent along an eluent supply line 42 forming a mobile phase to be delivered to a chromatography column in a well known manner. HPLC pump 30 includes reciprocating plunger or piston 32 which operably extends into a high-pressure chamber or head chamber 43 (see, e.g., FIG. 2) formed by pump head 31 of HPLC pump 30. Piston 32 is formed of sapphire, zirconium, ceramics or other known suitable materials. High-pressure chamber 31 is fluidly sealed, in part, by one or more high-pressure seals 50 through which plunger 32 extends.

As shown in FIG. 1, a rear side of high-pressure seal 50 may be followed by a small support ring 52 and a seal ring 53. A wash chamber 54 may be provided to minimize and/or prevent the growth of salt crystals on the rear side of high-pressure seal 50 due to leakage of chromatography eluent through seal 50.

In one embodiment shown in FIG. 3, toroidally-formed or wrap-around seal 50 includes a seal jacket 57 having an bore 58 through which piston 32 reciprocally extends. Seal 50 further includes an energizing seal component 59. Energizing seal component 59 primarily provides compressive forces to sealingly engage seal jacket against piston 32 and cavity wall 41. Additionally, energizing seal component 59 may also define the end shape of seal 50, for example, define the form or shape of the frontal pressurized portion of the seal. Energizing seal component 59 has an aperture therethrough and, in one embodiment, is in the form of an O-ring. Preferably, seal jacket 57 is formed of a polymeric material. Suitable materials for the seal body include, but are not limited to polytetrafluoroethylene (PTFE) or TEFLON®, ultra-high molecular weight polyethylene, unfilled polypropylene, TFE filled polypropylene, polyimid, and PEEK. Additionally, the seal jacket may be formed of one or more of these materials blended with other performance enhancing additives such as TEFLON®.

Preferably, energizing seal component 59 is formed of a polymer O-ring or metallic spring. Suitable materials for the O-ring include, but are not limited to fluorosilicone (FVMQ), polyacrylate (ACM, ANM), polysulfide (T), silicone (Q), fluorocarbon (FKM), perfluorocarbon (FFKM), fluorophosphonitrilic (FZ), perfluorastomer (FFKM), cholrosulfonated polyethylene (CSM), ethylene/propylene/diene or ethylene propylene terpolymer (EPDM), ethylene/ propylene or ethylene propylene copolymer (EPM), isobutylene/isoprene or butyl (IIR), polychloroprene (CR), urethane, polyether urethane (EU), epichlorohydrin (CO, ECO), polypropylene oxide (GPO), butadiene/acrylonitrile or Buna N (NBR), butadiene/styrene or Buna S (SBR), cis polybutadiene (BR), cis 1, 4, polyisoprene (NR, IR), polyester urethane (AU), ethylene-propylene (EPR), synthetic rubber and rubber compositions such as VITON® produced by DuPont Dow Elastomers L.L.C. of Wilmington Del., and nitrite (buna-N).

Alternatively, the energizing seal component may be formed of other materials to provide a compressive force for biasing the flared membrane against the inner cavity wall of the pump and the base against the piston of the pump. For example, the energizing seal component may be a spring formed of stainless-steel, titanium or other suitable materials. Additionally, the spring may be coated with TEFLON®, sapphire, carbon and/or other suitable coating materials.

With reference to FIG. 3, seal jacket 57 includes a generally cylindrical base 63 through which piston 32 reciprocally extends. An annular flange 60 extends radially outwardly from one end of cylindrical base 63. Although the illustrated seal jacket 57 is cylindrical, one should appreciate that other shapes can be utilized in accordance with the present invention. For example, the high-pressure seal can have an oval-shaped seal body or other geometrically shaped body.

A flared or formed membrane 64 extends axially from the other end of cylindrical base 63 and has a toroidally-shaped configuration such that the flared membrane 64 extends though and past O-ring 59 and folds back around the O-ring and overlaps a portion of cylindrical base 63 of the seal jacket, as shown in FIG. 3. Such overlapping configuration of flared membrane 64 provides an inert polymeric seal that virtually surrounds and isolates the O-ring based energizing seal component 59 from the fluid path of pump 30 thus minimizing and/or preventing extraction of contaminants from the O-ring. As O-ring 59 is isolated by flange membrane 64, a single O-ring material can be utilized for a wide variety of pumped fluids.

The flared or formed membrane can be molded or formed around the O-ring. Preferably, flared membrane 64 of seal jacket 57 is formed around O-ring 59 so as to overlap the O-ring, in which case, a sealing surface 64 can be readily formed in a shape which maximizes the contact area at the sealing point, as shown in FIG. 3. Flared membrane extends at least approximately 180° around O-ring 59 from bore 58 and past a center-line CL of the energizer component, also shown in FIG. 3. Seal jacket 57 may be machined and/or otherwise formed to a predetermined geometry prior to the forming of the wrap-around flared membrane 64.

Preferably, seal jacket 57 is monolithically formed. Flared or formed membrane 64 and cylindrical base 63 are formed of the same base material.

Figure 6:
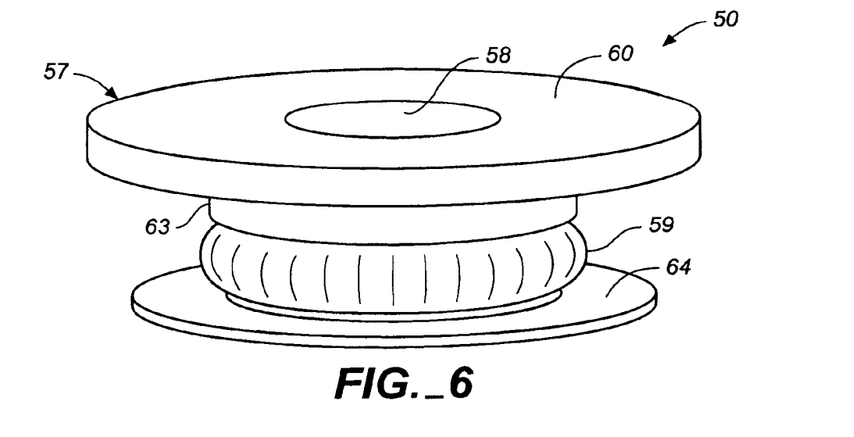
FIG. 6 is a perspective view of the flange seal of FIG. 3 with a flared membrane in an initial position.
Figure 7:
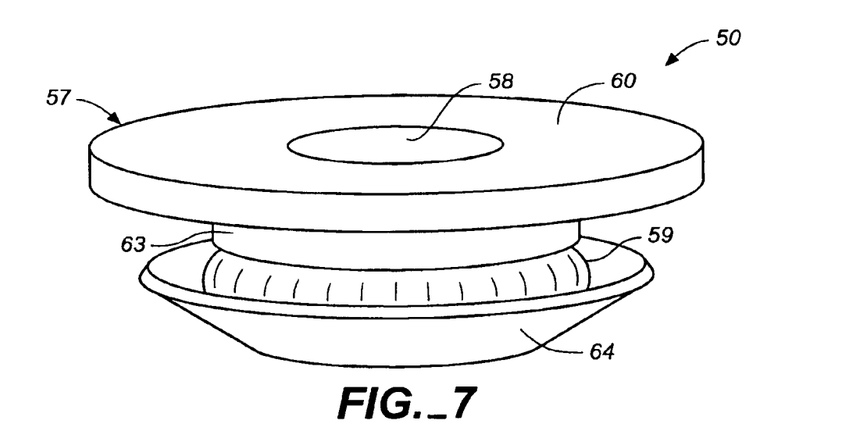
FIG. 7 is a perspective view of the flange seal of FIG. 3 with the flared membrane in an intermediate position.
Figure 8:
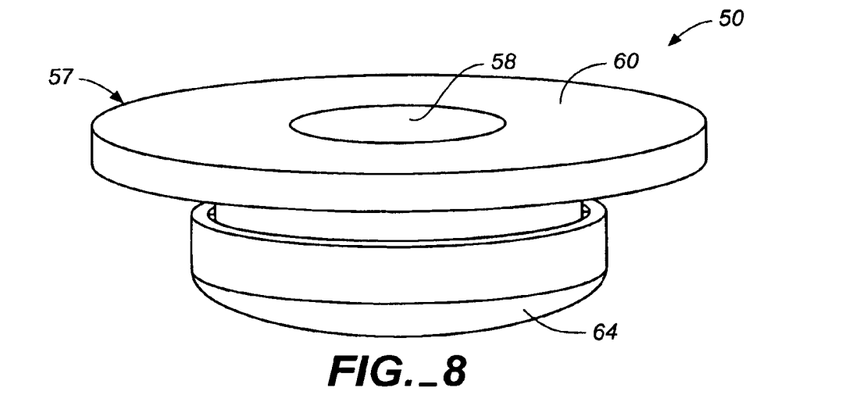
FIG. 8 is a perspective view of the flange seal of FIG. 4 with the flared membrane in a final position.

Seal 50 may be formed by using a progressive die technology or other suitable means. For example, seal jacket 57 may be machined to a predetermined unformed or initial geometry in which the flared membrane 64 extends radially outward from cylindrical base 63 in a first position, as shown in FIG. 6. With energizing component 59 in place, flared membrane 64 may be pressed or otherwise worked through an intermediate position, as shown in FIG. 7, to a capped or final position which isolates the energizing component, as shown in FIG. 8.

Figure 9:
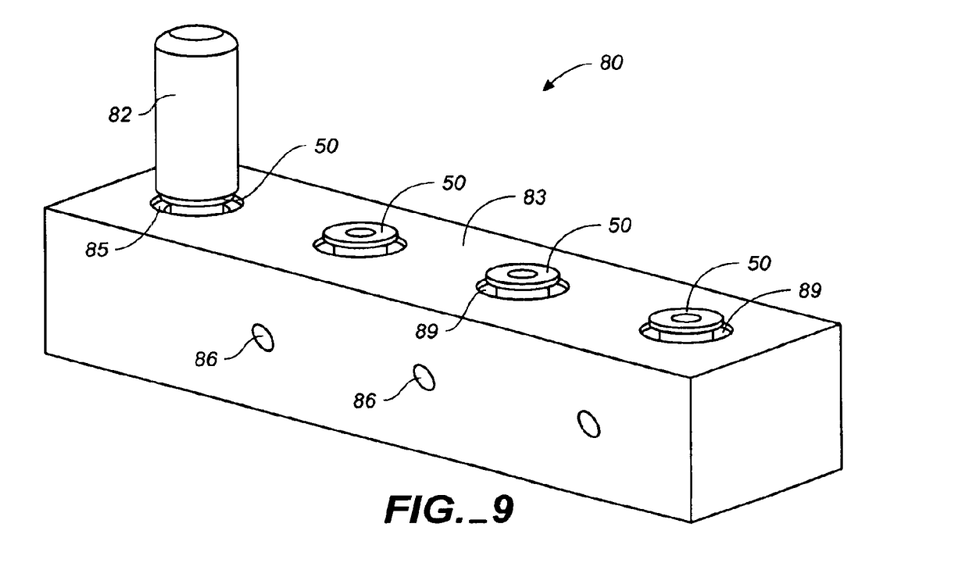
FIG. 9 is a perspective view of a flange forming apparatus for forming the flange seal of FIG. 3 in accordance with the present invention.

In the embodiment of FIG. 9, a flange forming apparatus 80 may be utilized to induce the final desired geometry of seal 50 in accordance with the present invention. In this embodiment, a flanging mandrel 82 supports seal 50 in an upright orientation during the forming process, as most clearly shown in FIG. 10. The mandrel may be of a specific shape to induce the final desired geometry of the seal surfaces it contacts.

Figure 10:
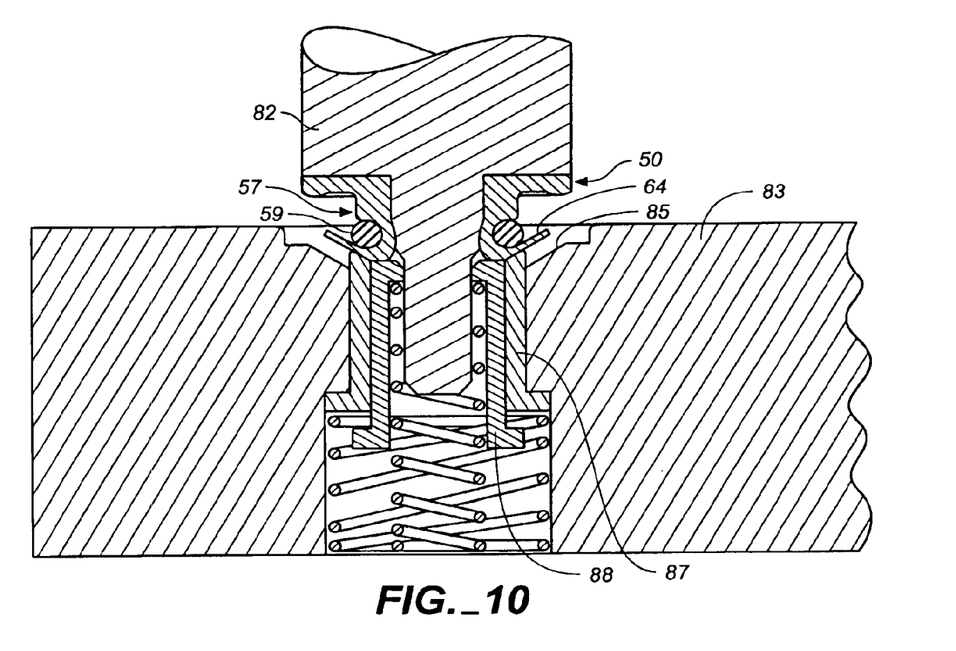
FIG. 10 is an enlarged cross-sectional side view of a portion of the apparatus of FIG. 9.

Mandrel 82 is moved downwardly toward a seal-forming platen 83. The seal-forming platen may be temperature controlled. Seal-forming platen 83 includes a flanging cavity 85 that provides the flange detail or final shape of flared membrane 64. One should appreciate that the shape of the flanging cavity may be varied to induce various final geometries or desired flange shapes. This process may be performed one or more times with progressive dies to obtain the final formed geometry or desired shape of flared membrane 64.

One or more spring-loaded sleeves 87, 88 may be provided within flanging cavity 85 to assist in positioning and moving flared membrane 64 to its final or formed position. Additionally, spring-loaded sleeves 87, 88 may be used to assist the ejection of seal 50 from cavity 85.

Seal-forming platen 83 may include one or more pneumatic-ejection flanging cavities 89 for shaping flared membrane 64 of seal 50. Each pneumatic-ejection cavity 89 includes an air input port 86 to allow ejection of seal 50 from flanging cavity 89 by way of known pneumatic means. One should appreciate that mechanical or other suitable means may also be utilized to eject seal 50 from flanging cavity 89 in accordance with the present invention.

Figure 11:
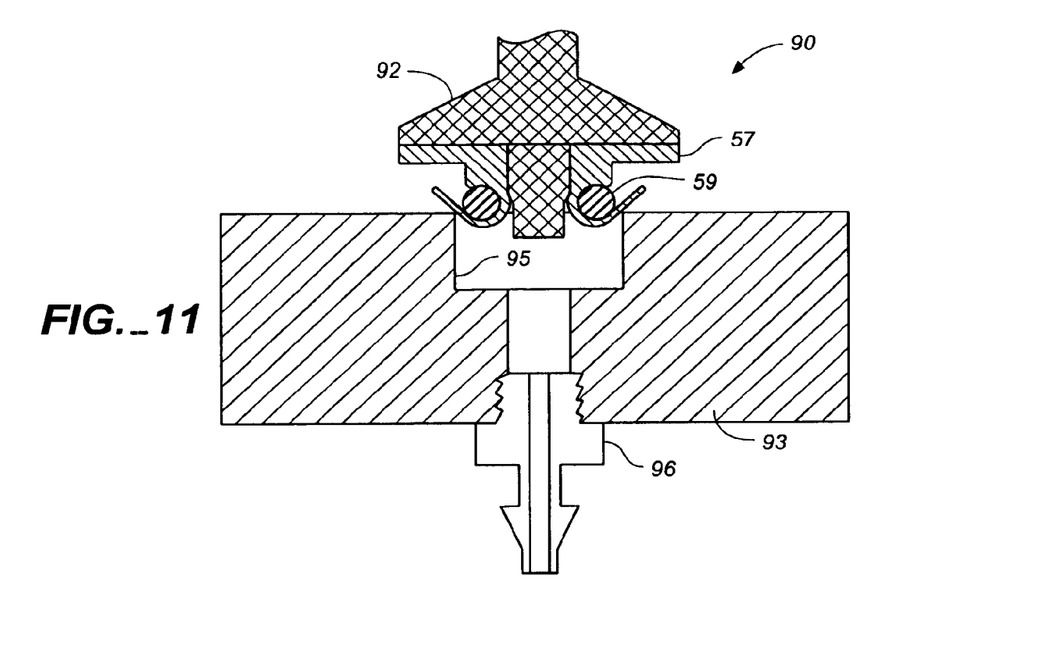
FIG. 11 is a cross-sectional view of a modified flange forming apparatus for forming the flange seal of FIG. 3 in accordance with the present invention, the apparatus shown in an intermediate position.

In another embodiment shown in FIG. 11, a flange forming apparatus 90 may be used to induce the final desired geometry of the seal surfaces of flared membrane 64 in accordance with the present. In this embodiment, seal 50 is supported by a flanging mandrel 92 which holds seal jacket 57 and energizing component 59 in an upright orientation as shown in FIG. 11. Mandrel 92 supports the seal during the forming process in a manner similar to that of mandrel 82 discussed above.

Figure 12:
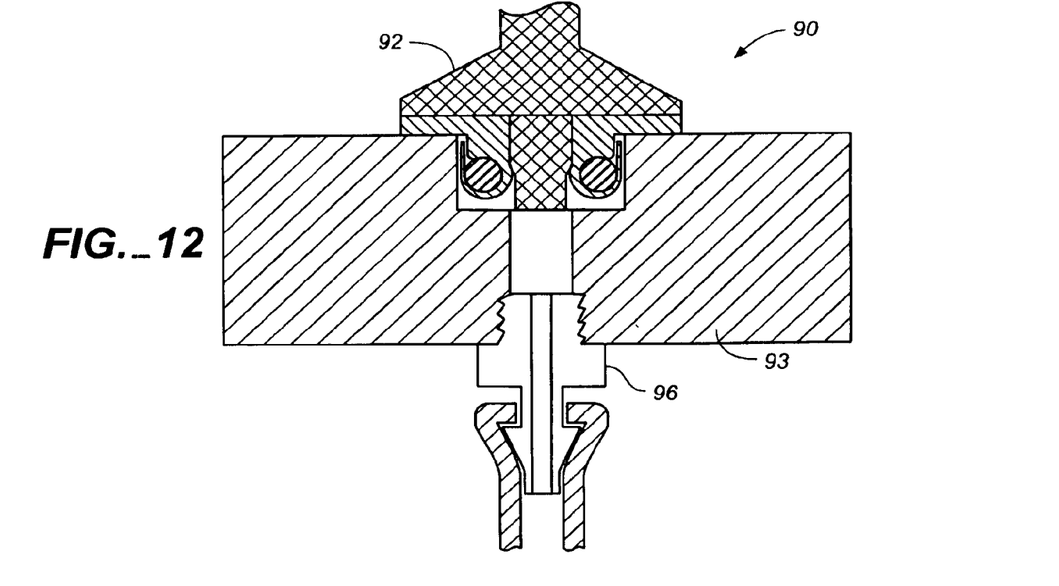
FIG. 12 is a cross-sectional view of the flange forming apparatus of FIG. 11 shown in a final position.

Mandrel 92 is moved downwardly toward a seal-forming platen 93, which platen may also be temperature controlled. Seal-forming platen 93 includes a flanging cavity 95 which forms the flange detail or final shape of flared membrane 64.

Seal-forming platen 93 may include an air input port 96 to facilitate ejection of seal 50 from flanging cavity 95 with known pneumatic means. One should appreciate that mechanical or other suitable means may be utilized to eject seal 50 from flanging cavity in accordance with the present invention.

Advantageously, the configuration of the present invention provides a seal having an O-ring or other energizer that is completely surrounded by a seal jacket thus eliminating all contact of the O-ring or other energizer with cavity wall of the pump thus minimizing and/or preventing abrasion of the O-ring or other energizer. The configuration of the seal isolates the O-ring or other energizer from fluid contact by forming a torus flange of the polymer outer jacket over the O-ring or other energizer. Accordingly, the likelihood of fluid contamination by O-ring or other energizer particles is also prevented.

Advantageously, the high-pressure seal of the present invention provides a means for isolating the elastomeric energizer, that is, the O-ring or other energizer, from pumped fluids flowing through a pump of a fluid system. In particular, the high-pressure seal of the present invention minimizes contamination of the pumped fluids by leaching from the elastomeric energizer while simultaneously minimizing and/or preventing corrosion of the energizer component. Seal life is maximized by preventing direct contact between the elastomeric energizer component and wear surfaces, for example, the cavity wall surface of the pump.

Such lower levels of corrosion and leachables from the energizing seal component of the seal promotes cleaner baselines and improves performance for a wide variety of chromatographic applications.

The high-pressure seal of the present invention also promotes longer seal life as the energizing element of the seal, for example, the O-ring or other energizer is protected from pumped fluid. Furthermore, the high-pressure seal facilitates priming performance of pumps equal to, or greater than, conventional pump seals. This is accomplished by the elimination of trapped air found in conventional seal designs.

Figure 5:
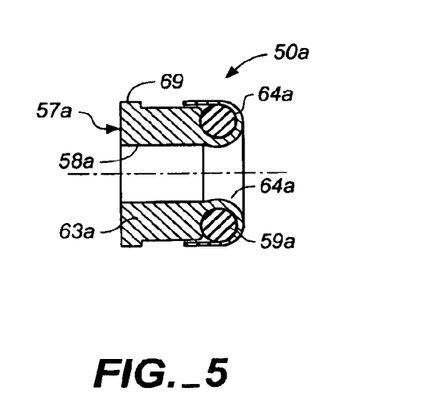
FIG. 5 is a cross-sectional side view of another seal for a high-pressure pumping system in accordance with the present invention having a modified seal jacket.

One should appreciate that the configuration of the high-pressure seal of the present invention can vary in accordance with the present invention. Turning now to FIG. 5, an alternative high-pressure seal 50a is similar to high-pressure seal 50 described above but includes a modified seal jacket 57a. Like reference numerals have been used to describe like components of the high-pressure seals of the present invention.

As shown in FIG. 5, seal jacket 57a includes a flared membrane 64a that extends axially from an end of cylindrical base 63a. Flared membrane 64a has a toroidally-shaped configuration such that the flared membrane 64a extends though and past O-shaped spring 59a and folds back around the spring in a similar manner as described above. However, seal jacket 57a does not have the annular flange of the preceding embodiment. Instead, an outermost surface 69 of cylindrical base 63a has an outer diameter that is substantially equal to the outer diameter of flared membrane 64a. Such configuration allows high-pressure seal 50a of the present invention to be used with pumps and other high-pressure devices that are not configured to receive an annular mounting flange.

Figure 13:
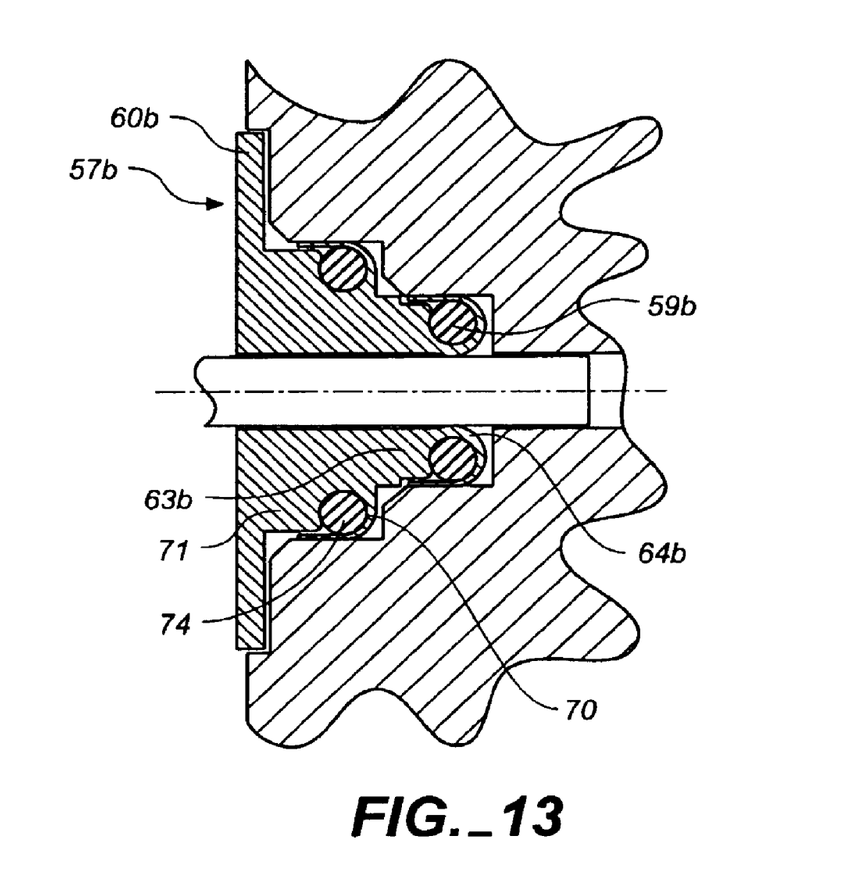
FIG. 13 is a cross-sectional side view of another seal for a high-pressure pumping system mounted in a modified pump head in accordance with the present invention, the flange seal including two O-rings and a modified seal jacket.

One should appreciate that the high-pressure seal of the present invention can include multiple flared membranes surrounding respective O-rings. Like reference numerals have been used to describe like components of high-pressure seals 50 and 50a. As shown in FIG. 13, a high-pressure seal 50b is similar to high-pressure seals 50 and 50a described above but include two flared membranes. Seal jacket 57b includes a first flared membrane 64b which extends axially from an end of cylindrical base 63b. First flared membrane 64b has a toroidally-shaped configuration such that the first flared membrane 64b extends though and past first O-ring 59b and folds back around the first O-ring in a similar manner as described above.

Seal jacket 57b further includes a second flared membrane 70 that extends from an end of an enlarged diameter portion 71 in a similar manner as first flared membrane 64b described above. In particular, second flared membrane 70 has a toroidally-shaped configuration such that the second flared membrane 70 extends through and past second O-ring 74 and folds back around the second O-ring, as shown in FIG. 13. Although the second flared membrane and the corresponding second O-ring of the illustrated embodiment is larger in diameter than the first, one should appreciate that the second membrane and corresponding membrane can be the same size or smaller than the first in accordance with the present invention. Furthermore, one should appreciate that the high-pressure seal of the present invention can have one, two, three or more O-rings of similar and/or varying dimensions and a corresponding number of flared membranes dimensioned to surround the respective O-rings.

Although the illustrated seal jacket 57b has an outwardly extending annular flange 60b, one should appreciate that an outwardly extending radially flange need not be provided in accordance with the present invention.

Figure 14:
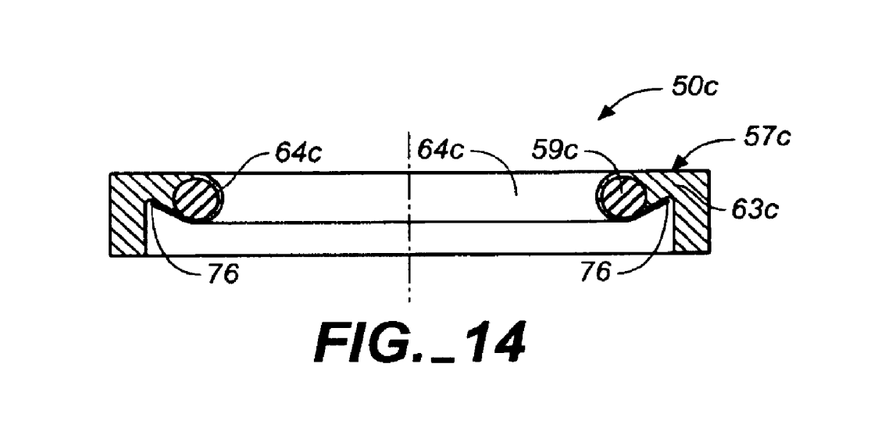
FIG. 14 is a cross-sectional side view of another seal for a high-pressure pumping system in accordance with the present invention having a modified seal jacket.

Turning now to FIG. 14, another alternative high-pressure seal 50c is similar to high-pressure seals described above but includes a modified large diameter seal jacket 57c, that is, a seal jacket having a higher diameter-to-longitudinal-length ratio as compared to the above seal jackets. As shown in FIG. 14, seal jacket 57c includes a flared membrane 64c that extends radially inward from an end of cylindrical base 63c. Flared membrane 64c has a toroidally-shaped configuration such that the flared membrane 64c extends past and though O-ring 59c and folds back around the O-ring in a similar manner as described above. In this embodiment, flared membrane 64c extends circumferentially further around O-ring 59c than the preceding embodiments and in excess of 180° around the O-ring. One should appreciate that the flared membrane need not extend 180° around the O-ring, but instead need only extend to such an extend that a terminal edge 76 of flared membrane 64c overlaps at least a portion of cylindrical base 63c such that the flared membrane virtually surrounds O-ring 59c.

Although the illustrated seal jacket 57c does not have an outwardly extending annular flange, one should appreciate that an outwardly extending radially flange similar to the preceding embodiments can be provided in accordance with the present invention.

For convenience in explanation and accurate definition in the appended claims, the terms "inner", "outer", upright, and downward, and similar terms are used to describe features of the present invention with reference to the positions of such features as displayed in the figures.

In many respects the modifications of the various figures resemble those of preceding modifications and the same reference numerals followed by subscripts a, b, and c designate corresponding parts.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A seal for a high-pressure pumping system comprising:
    an energizing seal component having an aperture extending therethrough; and
    a seal jacket component having a cylindrical base with an axial bore therethrough dimensioned to receive a reciprocating piston of the pumping system, said seal jacket component further having a toroidally-shaped flared membrane extending from one end of said base immediately adjacent said bore, said base and said flared membrane being monolithically formed, and said flared membrane extending axially away from said one end of said base, through said aperture and encircling said energizing seal component to isolate said energizing seal component from fluid of pumping system.

2. The seal of claim 1 wherein said energizing seal component is an O-ring.

3. The seal of claim 1 wherein said energizing seal component is formed of an elastomeric material.

4. The seal of claim 1 wherein said energizing seal component is a spring.

5. The seal of claim 4 wherein said spring is formed of stainless-steel.

6. The seal of claim 1 wherein said flared membrane encircles said energizing seal component and overlaps a portion of said base.

7. The seal of claim 1 wherein said seal jacket component is formed around said energizing seal component.

8. The seal of claim 1 wherein said seal jacket component is formed of an inert polymeric material.

9. The seal of claim 1 wherein said seal jacket component is formed of a polymer.

10. The seal of claim 1 wherein said flared membrane is configured and dimensioned to isolate said energizing seal component from fluid of the pumping system.

11. The seal of claim 1 wherein said flared membrane extends at least approximately 180° around said energizing seal component and past a center-line CL of said energizing seal component.

12. A seal for a high-pressure pumping system comprising:
   an energizing seal component having an aperture extending therethrough; and
   a seal jacket component having a base and a flared membrane extending from said base, said base and said flared membrane being monolithically formed, and said flared membrane extending axially from one end of said base, through said aperture and encircling said energizing seal component to isolate said energizing seal component from fluid of the pumping system;
   wherein said seal jacket component includes a flange extending radially outwardly from said base.

13. A seal for a high-pressure pumping system comprising:
   an energizing seal component formed of an elastomeric material and having an aperture extending therethrough; and
   a seal jacket component having a base and a toroidally-shaped flared membrane extending from said base, said base and said flared membrane being monolithically formed of an inert polymeric seal material, said flared membrane extending through said aperture and encircling said energizing seal component to isolate said energizing seal component from fluid of the pumping system;
   wherein said seal jacket component includes a flange extending radially outwardly from said base.

14. The seal of claim 13 wherein said flared membrane encircles said energizing seal component and overlaps a portion of said base.

15. The seal of claim 13 wherein said seal jacket component is formed around said energizing seal component.

16. The seal of claim 13 wherein said flared membrane extends at least approximately 180° around said energizing seal component and past a center-line CL of said energizing seal component.

17. The seal of claim 13 wherein said energizing seal component is an inert elastomeric material.

18. The seal of claim 13 wherein said energizing seal component is an O-ring.

19. The seal of claim 13 wherein said energizing seal component is a spring.

* * * * *